United States Patent
Seman, Jr.

(10) Patent No.: US 8,035,343 B2
(45) Date of Patent: Oct. 11, 2011

(54) METHOD FOR BALANCING CELLS IN A BATTERY PACK

(75) Inventor: Andrew E. Seman, Jr., White Marsh, MD (US)

(73) Assignee: Black & Decker Inc., Newark, DE (US)

( * ) Notice: Subject to any disclaimer, the term of this patent is extended or adjusted under 35 U.S.C. 154(b) by 256 days.

(21) Appl. No.: 12/245,957

(22) Filed: Oct. 6, 2008

(65) Prior Publication Data

US 2009/0096421 A1    Apr. 16, 2009

Related U.S. Application Data

(60) Provisional application No. 60/999,025, filed on Oct. 15, 2007.

(51) Int. Cl.
*H02J 7/00* (2006.01)
(52) U.S. Cl. ........................................ 320/119; 320/122
(58) Field of Classification Search .................. 320/119, 320/122
See application file for complete search history.

(56) References Cited

U.S. PATENT DOCUMENTS

| | | | | |
|---|---|---|---|---|
| 4,238,721 A * | 12/1980 | DeLuca et al. | ................ | 320/122 |
| 5,504,415 A * | 4/1996 | Podrazhansky et al. | ....... | 320/118 |
| 5,998,967 A | 12/1999 | Umeki et al. | | |
| 6,121,752 A * | 9/2000 | Kitahara et al. | ............... | 320/122 |
| 6,975,094 B1 * | 12/2005 | Lascaud et al. | ............... | 320/122 |
| 7,126,312 B2 | 10/2006 | Moore | | |
| 7,262,580 B2 * | 8/2007 | Meyer et al. | .................. | 320/110 |
| 7,408,325 B2 * | 8/2008 | Yamamoto et al. | ........... | 320/133 |
| 7,456,610 B2 * | 11/2008 | Yamashita | .................... | 320/119 |
| 2006/0071643 A1 | 4/2006 | Carrier et al. | | |

* cited by examiner

*Primary Examiner* — Edward Tso
*Assistant Examiner* — Ramy Ramadan
(74) *Attorney, Agent, or Firm* — Michael Aronoff; Adan Ayala

(57) ABSTRACT

A method is provided for charging a plurality of cells in a battery pack to a target charging value. The method includes: delivering a charging current to the plurality of cells; monitoring cell voltage of each cell in the plurality of cells to determine when at least one of the cells reaches the target charging value; and diverting the charging current around the cells having reached the target charging value and cooperatively adjusting the charging current so that a current received by the cells having reached the target charging value is substantially zero.

15 Claims, 5 Drawing Sheets

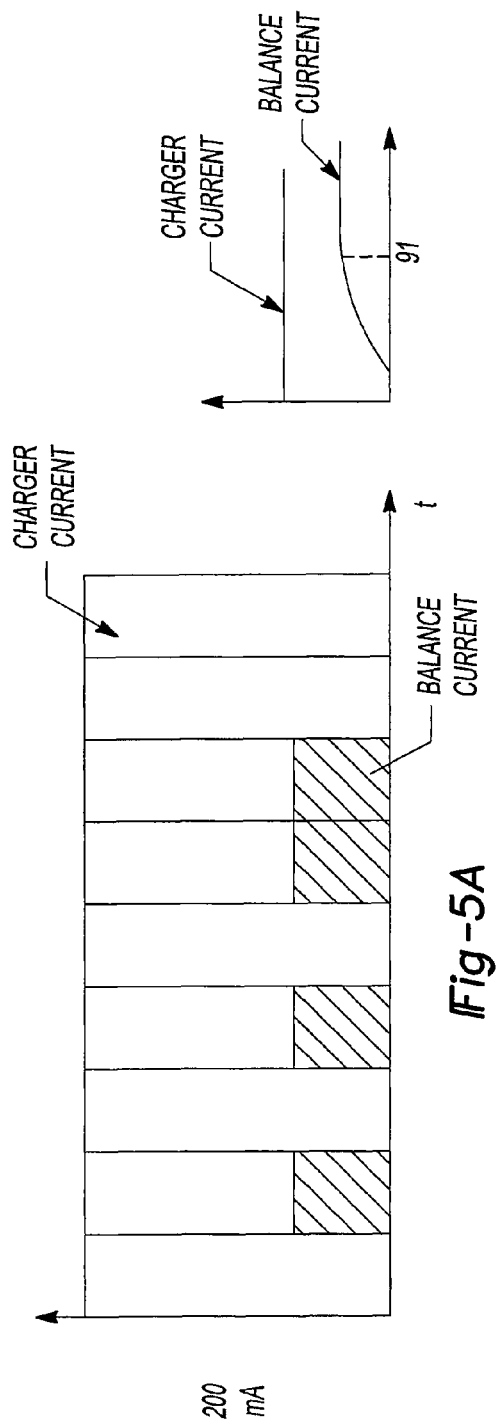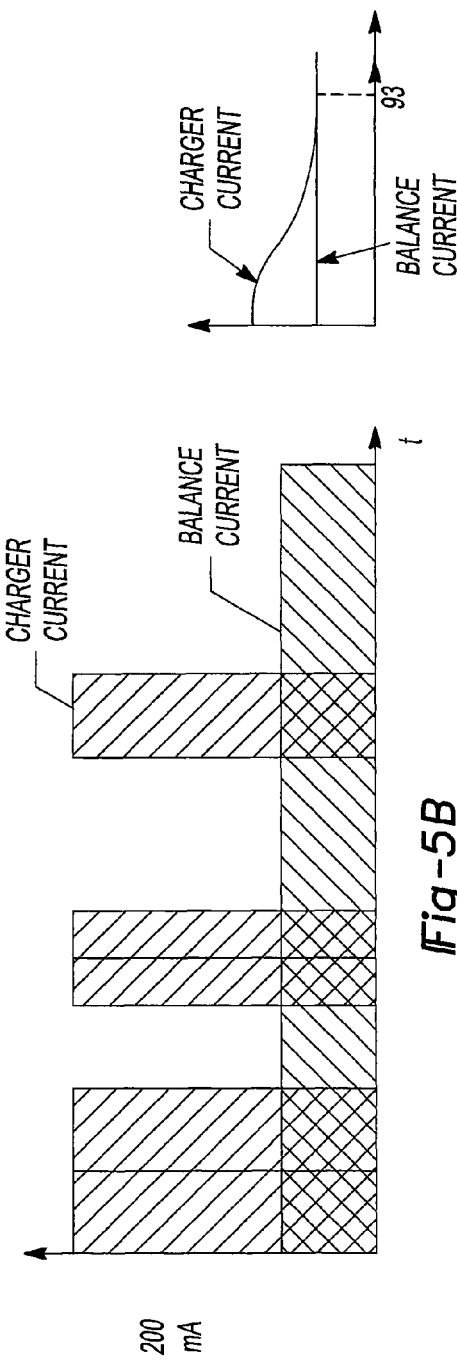

METHOD FOR BALANCING CELLS IN A BATTERY PACK

CROSS-REFERENCE TO RELATED APPLICATIONS

This application claims the benefit of U.S. Provisional Application No. 60/999,025, filed on Oct. 15, 2007. The disclosure of the above application is incorporated herein by reference.

FIELD

The present disclosure relates to techniques for balancing cells in a battery pack.

BACKGROUND

Cordless products or devices which use rechargeable batteries are prevalent in the marketplace. Rechargeable batteries may be used in numerous devices ranging from computers to power tools. Since the devices use a plurality of battery cells, the battery cells are commonly packaged in a battery pack. The battery pack may in turn be used to power the devices when coupled thereto. Once depleted, the battery pack may be recharged.

In a typical charging scheme, a constant current is delivered to the battery cells until each cell reaches a target charge level. However, due to inherent differences between battery cells, not all battery cells have the same capacity. Consequently, some battery cells in a pack may charge faster or slower than other battery cells in the pack. To ensure that all of the cells in a pack stabilize at the target charge level, cell balancing may be employed during the charging process. Conventional cell balancing is rather time consuming because it is implemented using very low currents near the end of the charge process. Therefore, it is desirable to improve upon conventional cell balancing techniques.

The statements in this section merely provide background information related to the present disclosure and may not constitute prior art.

SUMMARY

A method is provided for charging a plurality of cells in a battery pack to a target charging value. The method includes: delivering a charging current to the plurality of cells; monitoring cell voltage of each cell in the plurality of cells to determine when at least one of the cells reaches the target charging value; and diverting the charging current around the cells having reached the target charging value and cooperatively adjusting the charging current so that a current received by the cells having reached the target charging value is substantially zero.

In one aspect of this charging scheme, a divergence in cell voltage amongst two or more of the plurality of cells is detected prior to any of the cells reaching the target charging value. When the divergence exceeds a predefined threshold, the charging current is diverted around select cells of the plurality of cells.

Further areas of applicability will become apparent from the description provided herein. It should be understood that the description and specific examples are intended for purposes of illustration only and are not intended to limit the scope of the present disclosure.

DRAWINGS

FIG. 1 is a diagram of an exemplary system of power tools;

FIG. 2 a block diagram of an exemplary configuration for a battery pack and a battery charger;

FIGS. 5A and 5B are diagram illustrating charge current and balance current during the charging scheme of the present disclosure.

DETAILED DESCRIPTION

Figure 1:
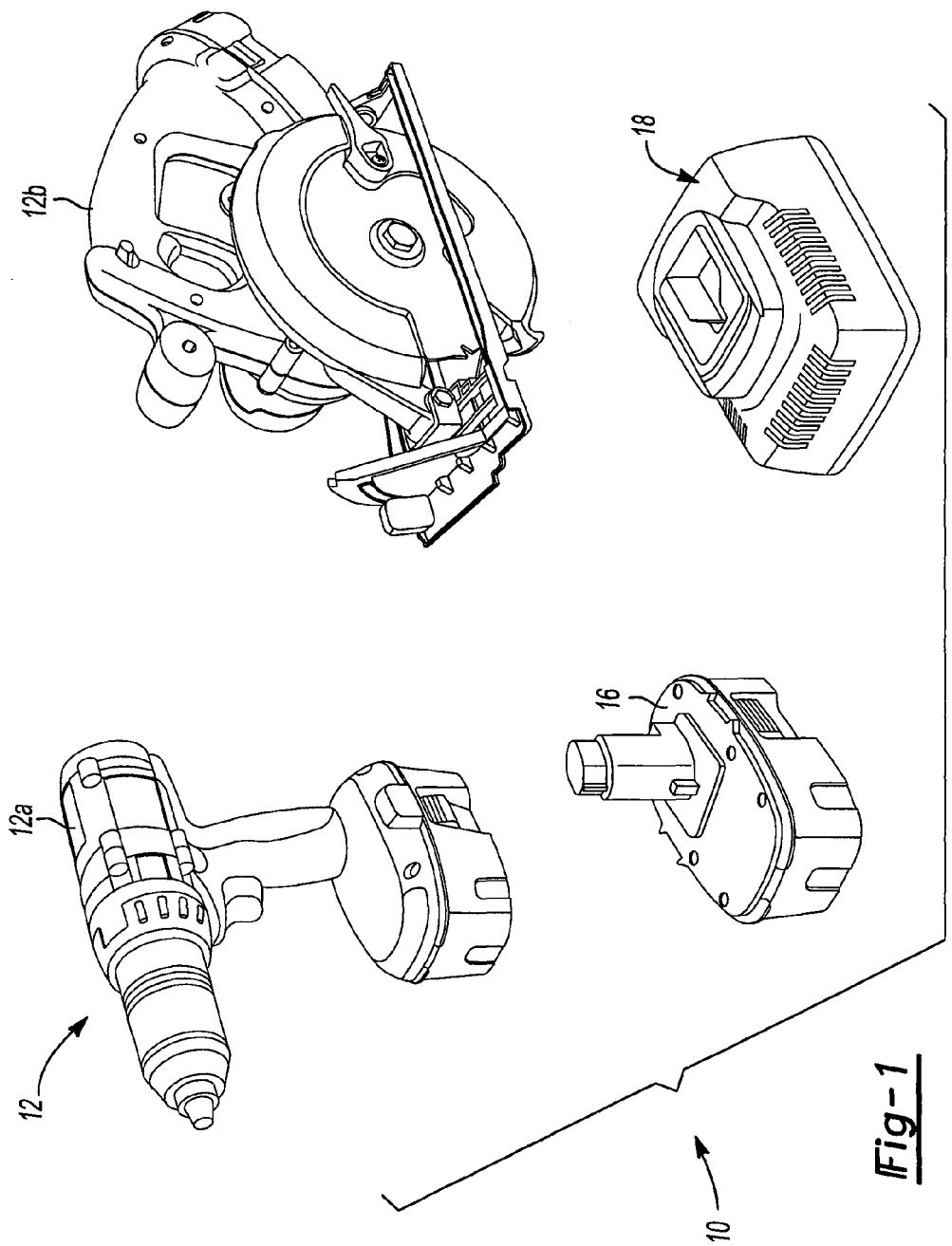

The present disclosure can relate to a system of power tools of the type that is generally indicated by reference numeral 10 in FIG. 1. The system of power tools 10 can include, for example, one or more power tools 12, a battery pack 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. It is noteworthy that the broader aspects of this disclosure are applicable to other types of battery powered devices.

Figure 2:
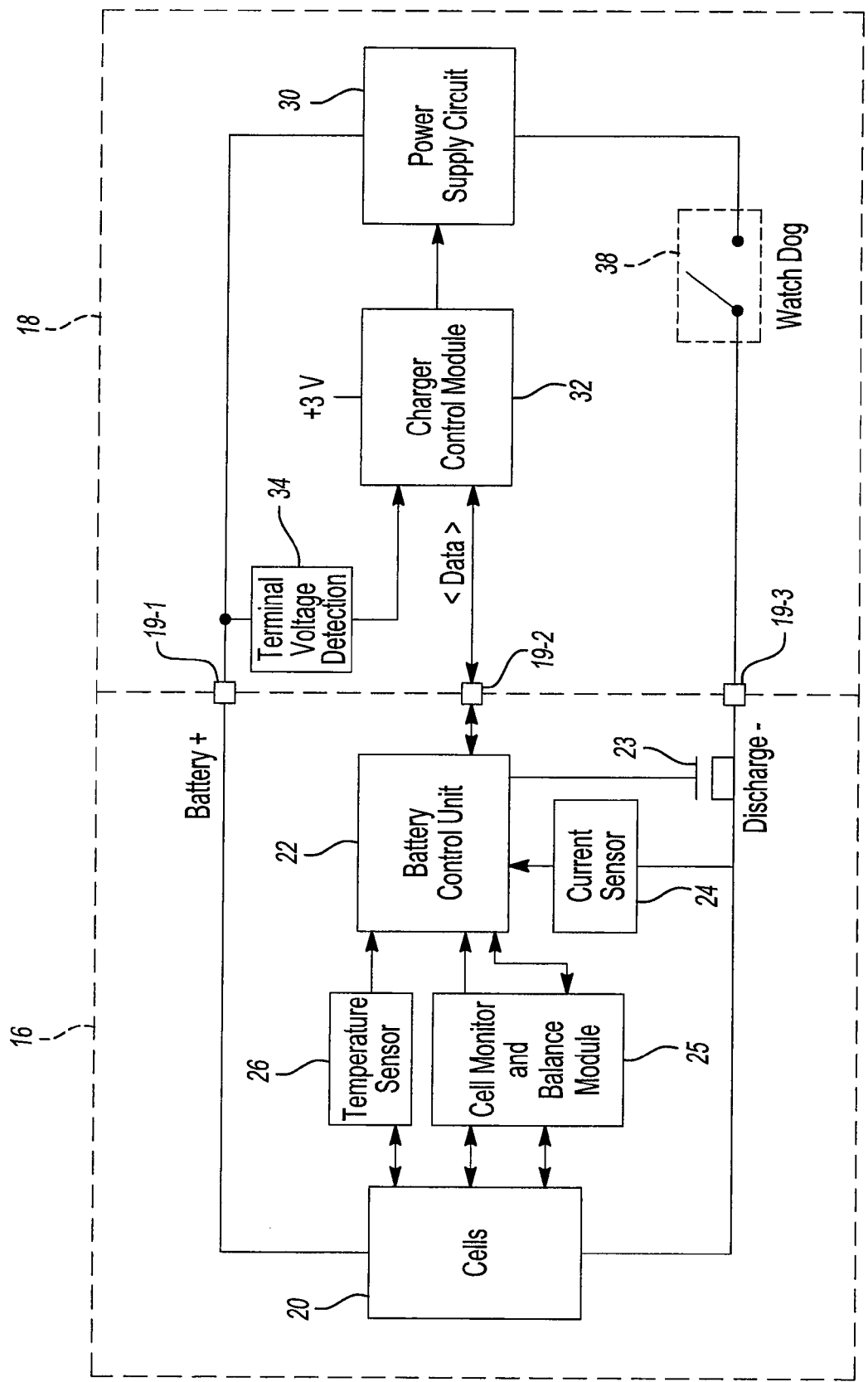

FIG. 2 illustrates an exemplary configuration of a battery pack 16 operably coupled to a battery charger 18. The battery pack 16 is generally comprised of a plurality of battery cells 20, a battery control unit 22 and various battery control circuits. The battery charger 18 is generally comprised of a charger control unit 32 and a power supply circuit 30 (i.e., current source). The exemplary configurations are merely provided as a context for describing the charging methods disclosed herein. Moreover, the configuration may represent only a portion of the internal circuitry. The battery pack and/or the battery charger may include additional functionality or components such as pack identification components, other protection circuits and/or other internal components which are not shown herein for reasons for clarity.

The battery pack 16 may include a plurality of battery cells 20 connected in series, and/or a plurality of serially-connected strings of cells, in which cells within the strings are in parallel with one another. For purposes of describing the exemplary embodiments, the battery pack may be composed of cells having lithium-ion cell chemistry. In the context of cordless power tools, the nominal voltage rating of the battery pack is typically at least 18 volts. However, other voltage ratings are contemplated for different applications. In addition, the battery pack may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack.

A battery control unit 22 embedded within the battery pack 16 is responsible for protecting the battery cells and monitoring any fault conditions which may develop. In an exemplary embodiment, the battery control unit 22 is implemented in software on a digital microcontroller. However, the battery control unit 22 may be embodied in hardware or software as a digital microcontroller, a microprocessor or an analog circuit, a digital signal processor or by one or more digital ICs such as application specific integrated circuits (ASICs), for example.

Discharge current from the battery cells and charge current to the battery cells can be clamped or discontinued through the use of a switch 23. The switch 23 may be placed in series with the battery cells on the low voltage side of the battery cells. The switch 23 can then be controlled by the battery control unit 22 to interrupt current flow to/from the battery cells. In an exemplary embodiment, the switch 23 is a transistor (e.g., a MOSFET). Other types of switches are also contemplated by this disclosure.

A current sensor 24 is configured to sense the current being supplied by the battery and provide a signal indicative of the sensed current to the battery control unit 22. In an exemplary embodiment, the current sensor 24 may be implemented using a current shunt disposed in series with the battery cells 20. The current shunt is preferably positioned on the low voltage side of the battery cells. In an alternative embodiment, the switch 23 is used as the current sensor. In other words, the battery control unit 22 monitors the current being drawn across the switch 23. In the case of the transistor, the current is measured using the resistance $R_{on}$ as a current shunt that converts the current into a voltage that can be read by the battery control unit. Other types of current sensors (e.g., a Hall effect current sensor) are also within the scope of this disclosure.

A cell monitoring arrangement 25 may be configured to sense individual cell voltage and sense total pack voltage of the cells 20. The cell monitoring arrangement 25 provides a signal representing the individual cell or stack voltage to the battery control unit 22. Alternatively, the battery control unit 22 may direct the cell monitoring arrangement 25 to periodically measure the cell voltage across each cell of the pack and the total pack voltage in a sequential manner. An average cell voltage may be determined by dividing the measured total pack voltage by the number of cells in the pack. The battery control unit 22 may in turn interface with the cell monitoring arrangement 25 to control the balancing of cell voltages during the charging process. Further details regarding an exemplary cell monitoring arrangement are provided below in relation to FIG. 3.

A temperature sensor 26 may be configured to measure the temperature of the battery cells. The temperature sensor in turn communicates the measured temperature to the battery control unit 22. The temperature sensor may be implemented with negative temperature coefficient (NTC) thermistor, a positive temperature coefficient (PTC) thermistor, temperature sensing integrated circuits, or thermocouples.

The battery pack 16 is selectively coupled to a battery pack charger 18. The battery pack charger 18 is generally comprised of a power supply circuit 30 and a charger control unit 32. The battery pack charger may also include a terminal voltage detection circuit 34 and a watchdog circuit 38. It is envisioned that other sensing and/or protections circuits may also be incorporated in the battery charger.

The charger control unit 32 is responsible for charging the battery cells and monitoring any fault conditions which may develop. In an exemplary embodiment, the charger control unit 32 is implemented in software on a digital microcontroller. However, the charger control unit 32 may be embodied in hardware or software as a digital microcontroller, a microprocessor or an analog circuit, a digital signal processor or by one or more digital ICs such as application specific integrated circuits (ASICs), for example.

Charger control unit 32 and battery control unit 22 may exchange data through a data terminal 19-2. This data terminal provides a serial data link between two control units. Diagnostic measures made in the battery pack 16 may be passed by the battery control unit 22 to the charger control unit 32. In addition, control parameters may be passed between the charger control unit 32 and the battery control unit 22. Exchanged data may include but is not limited to an identifier for the charger and/or battery pack, individual or total stack voltage as determined by the pack, temperature conditions in the pack, etc. Other types of communications are also contemplated by this disclosure.

Figure 3:
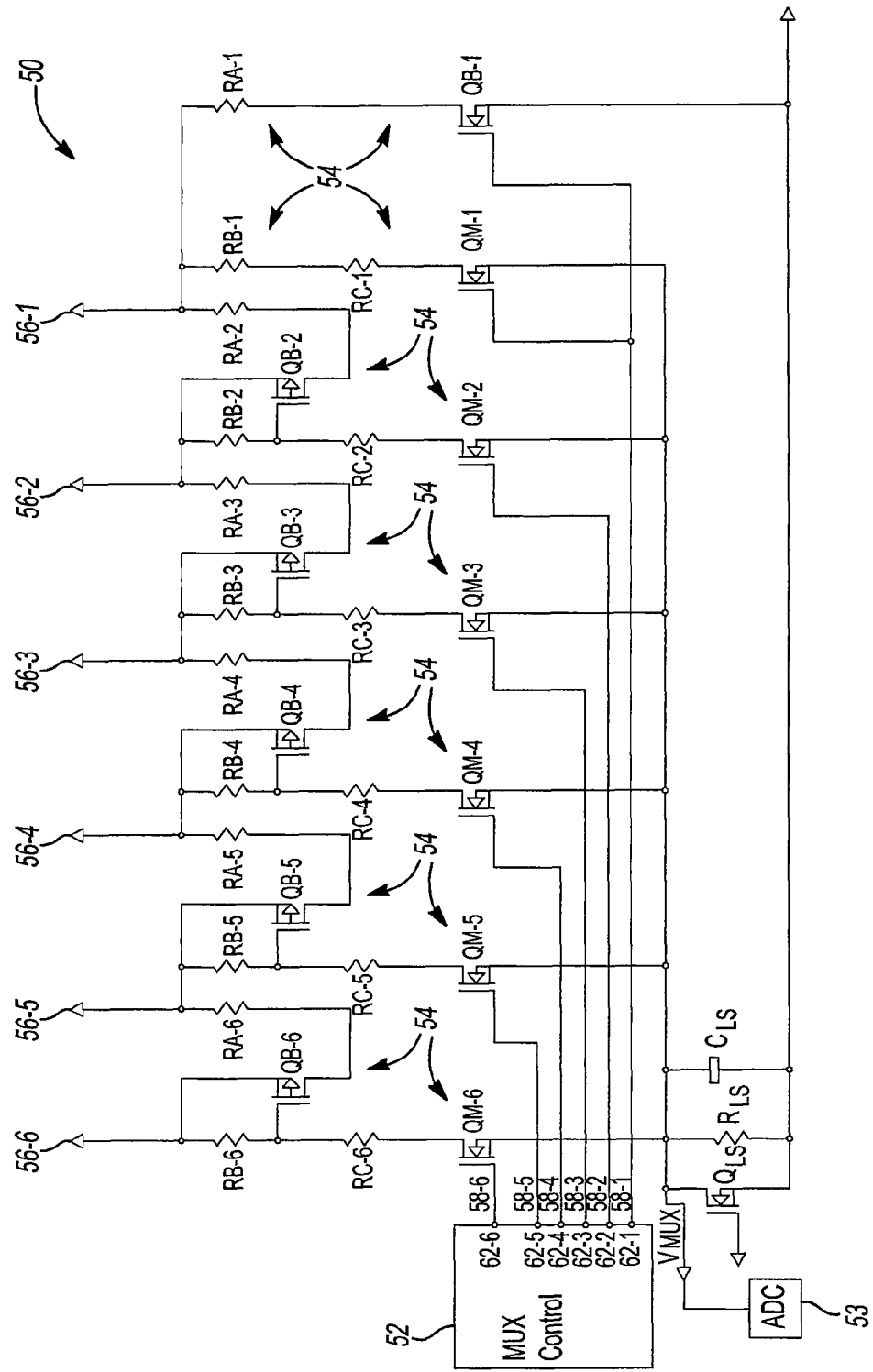
FIG. 3 is a schematic depicting an exemplary cell monitoring arrangement for use in a battery pack.

FIG. 3 illustrates an exemplary cell monitoring arrangement. The cell monitoring arrangement is comprised of a monitoring and balancing circuit 50, a multiplexer controller 52 and a single analog-to-digital converter (ADC) 53. The monitoring and balancing circuit 50 includes a plurality of monitoring and balancing (M&B) sub-circuits 54. More particularly, an M&B sub-circuit 54 is provided for each cell 20 of the battery 16. For example, the exemplary monitoring and balancing circuit 50 illustrated in FIG. 3 is configured for use with a battery 16 having six cells 20 and thus includes six M&B sub-circuits 54-1 through 54-6. It is readily understood that the cell monitoring arrangement may be configured to support more or less than six cells.

Each M&B sub-circuit 54 is interposed between a corresponding one of a plurality of cell nodes 56 (e.g., 56-1 through 56-6) and a corresponding one of a plurality of control lines 58 (e.g., 58-1 through 58-6). Each node 56 is connected to a respective one of the cells 20 and each control line 58 is coupled to a respective channel port 62 (e.g., 62-1 through 62-6) of a multiplexer 52. Alternatively, each control line 58 may be input directly into ports of the battery control unit 22.

Implementation of the multiplexer controller 52 to operate each M&B sub-circuit 54 of the monitoring and balancing circuit 50 allows the cell monitoring arrangement to monitor during discharging, and monitor and balance during charging, each individual cell 20 utilizing a single ADC, e.g., ADC 53. An output line $V_{MUX}$ of the monitoring and balancing circuit 50 presents a selected node voltage and that voltage is input to the ADC 53 to provide voltage measurements for the battery control unit 22. Utilizing a single ADC provides highly accurate voltage readings during the monitoring and balancing process described herein. Alternatively, the output line $V_{MUX}$ may be input directly to an ADC pin of the battery control unit 22. Tied between the $V_{MUX}$ output line and ground is a low side resistor $R_{LS}$ common to each M&B sub-circuit 54, and a low side capacitor $C_{LS}$ in parallel with the low side resistor $R_{LS}$ that smoothes the voltage readings on $V_{MUX}$.

Each M&B sub-circuit 54 includes a first resistor RA connected to drain of cell balancing field effect transistor (FET) QB. In accordance with various embodiments, each first resistor RA-1 through RA-6 has the same rated resistance value, e.g., 100 ohms. The gate of each cell balancing FET QA is center taped between a second resistor RB and third resistor BC. The outer leg of each third resistor RC is tied to the drain of a cell monitoring FET QM and the gate of each cell monitoring FET QM is connected to the respective control line 58 and thus, tied to the respective channel 62 port of the multiplexer controller 52. The outer leg of each second resistor RB is connected to the source of each respective cell balancing FET QB and to the respective node 56.

During discharge of the battery 16, the cell monitoring and balancing arrangement 25 monitors the voltage across each cell 20 to prevent any of the cells 20 from being discharged below a predetermined minimum voltage, e.g., 3 volts. More specifically, the battery control unit 22 communicates with the multiplexer controller 52 to sample the voltage across each cell 20 at a particular rate while the battery pack 16 discharging, via the monitoring and balancing circuit 50. If, during discharge, the voltage across any cell 20 drops to the predetermined minimum voltage, the battery control unit 22 will open the switch 23 (FIG. 1) to discontinue current flow from the battery cells 20.

To monitor the voltage of each cell 20 during the discharge and charge modes, the battery control unit 22 executes a voltage monitoring algorithm that sequentially selects each of the multiplexer channels 62. Upon selection of a channel 62 the respective cell monitoring FET QM is turned on allowing current to flow through the second and third resistors RB and RC of the respective M&B sub-circuit 54. Subsequently, the node voltage at each node 56 can be determined based on the voltages across each of the resistors RB and RC in the respective M&B sub-circuit 54. Thus, the node voltage at each node 56-1 through 56-6 is measured and stored in memory of the battery pack 16.

In accordance with the exemplary monitoring and balancing circuit 50 illustrated in FIG. 3, the cell voltage, or voltage potential, of the cell 20 connected to the first selected node 56 would be equal to the node voltage measured at that particular node 56. However, to determine the voltage for each of the remaining subsequently selected cells 20, the battery control unit 22 subtracts the node voltage of the preceding node 56 from the node voltage of node 56 for which the cell voltage measurement is desired, (e.g., $V_{cell(x)}=V_{node(x)}-V_{node(x-1)}$). For example, if the battery control unit 22 sequentially selects channel 62-1 through 62-6, starting with channel 62-1 and ending with channel 62-2, then the cell voltage of the cell 20 connected to node 56-1 would be equal to the node voltage at node 56-1. Subsequently, to determine the cell voltage of the cell 20 connected to node 56-2, the battery control unit 22 subtracts the node voltage at node 56-1 from the node voltage at node 56-2. And, to determine the voltage potential of the cell 20 connected to node 56-3, the battery control unit 22 subtracts the node voltage at node 56-2 from the node voltage at node 56-3, and so on, until the cell voltage for each individual cell 20 is determined. It should be noted that structuring the monitoring and balancing circuit 50 to include the common low side resistor $R_{LS}$ standardizes the error for each channel 62 and thus, provides very accurate voltage measurement for each of the cells 20.

During charging, it may be necessary to divert the charging current around select cells of the battery pack. Cell balancing FETs QB are normally maintained in an open state but are closed when the mux channel is selected. During measurement, channels are selected for brief periods of time (e.g., 1 millisecond). To divert charging current around a given cell, multiplexer controller 52 may select a measurement channel for a period considerably longer than the measurement period (e.g., 1 second) which thereby allows current to flow through the corresponding first resistor RA.

During the charge mode, the sampling rate of the cells 20 is much longer than in the discharge mode to allow for greater accuracy and to allow time for balancing of the cell voltages.

In the exemplary embodiment, the monitoring and balancing circuit 50 additionally includes a low side FET $Q_{LS}$ that is turned on during charge/balance mode to allow more than one of the second FETs QB-1 through QB-6 to be simultaneously tuned on to balance the cells 20. More particularly, the low side FET $Q_{LS}$ effectively grounds the $V_{MUX}$ line when more than one second FET QB is turned on during cell balancing to prevent the voltage on $V_{MUX}$ from exceeding a rated limit. Further details regarding this exemplary cell monitoring arrangement may be found in U.S. patent application Ser. No. 12/170,718 filed on Jul. 10, 2008 which is incorporated herein by reference. While a particular cell monitoring arrangement has been set forth above, it is readily understood that other arrangements may be used in conjunction with the charging method described herein. Another exemplary cell monitoring arrangement is disclosed in U.S. Patent Application Publication No. 2006/0071643 which is also hereby incorporated by reference.

Figure 4:
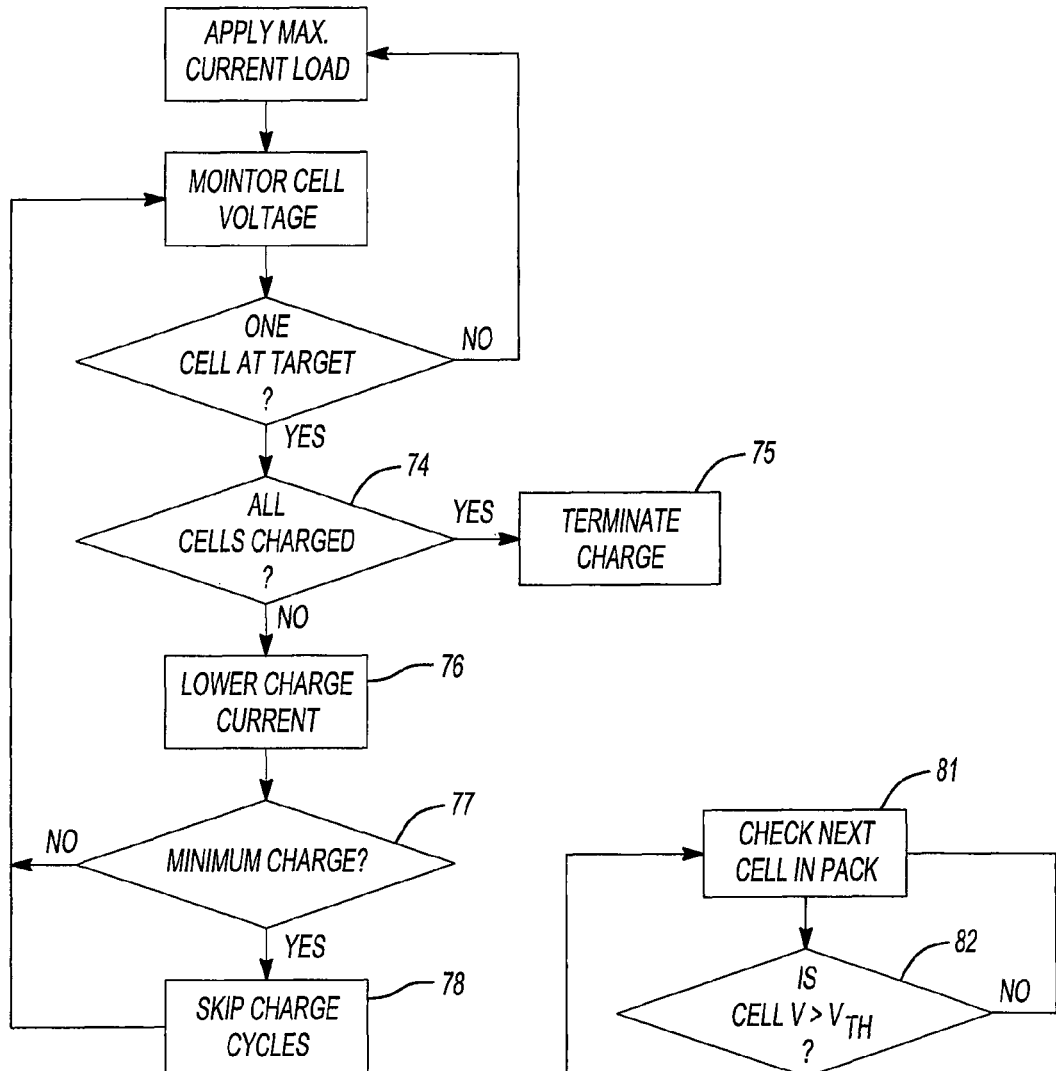
FIG. 4 is a flowchart illustrating an exemplary charging scheme according to the present disclosure.

FIG. 4 illustrates an exemplary charging scheme in accordance with this disclosure. To charge a battery pack, the pack is operably coupled to the battery charger. Upon detecting the battery pack, the battery charger initiates the charging scheme described below. Various techniques for detecting the presence of the battery pack may be employed.

The battery charger begins by delivering a charge current 71 to the battery pack. The charge current may be set at a maximum value which can be delivered by the charger (e.g., 3 amps) or some lesser value. In an exemplary embodiment, the charge current is delivered in periodic charge cycles (e.g., cycles of one second duration).

Cell voltages are continually being monitored at 72 during the charging process. In the exemplary embodiment, the cell voltage measurements can be made between charge cycles by the cell monitoring arrangement as described above. The cell monitoring circuit is preferably configured to take individual cell measurements in a sequential manner during a span of about 10 milliseconds. Individual cell measurements are in turn reported to the battery control unit for further assessment. It is also envisioned that the charge current may be delivered constantly such that cell voltage measurements are taken while the charge current is being delivered to the battery cells.

The maximum charge current will continue to be delivered to the battery pack until at least one of the battery cells reaches a target charging value (e.g., 3.6 volts). When one or more of the battery cells reaches the target charging value, the charge current will be lowered as indicated at 76. In an exemplary embodiment, the charge current is lowered in predefined increments. For example, the charge current may be reduced in half until it reaches a minimum charge current (e.g., 200 mA) that can be output by the charger.

The average charge current delivered to the battery cells may be lowered further by skipping charge cycles. When the charger is outputting a minimum charge current and less than all of the cells have reached the target charge value, charge cycles are skipped at 78 to further lower the average charge current delivered to the cells. For example, skipping every other charge cycle further reduces the average charging current being delivered by the charger by 50% (e.g., from 200 mA to an average of 100 mA).

After each charge cycle, cell measurements are taken and a determination is made as to whether to lower the charge current. In the exemplary embodiment, the determination to lower the charge current is made by the battery control unit which sends a command to lower the charge current via the serial data link to the charger control unit. In response to this command, the charger control unit interfaces with the power supply circuit to lower the charge current being delivered by the charger. When all of the battery cells have reached the target charge value, the charge current is terminated as indicated at 75.

The charging scheme described above cooperatively functions with a cell balancing method. In one exemplary embodiment, the balancing method compares the cell voltage for each cell to the target charge value. If the cell voltage for a given cell exceeds the target charge value, then the charge current is diverted around the given cell. Current is diverted by the cell monitoring arrangement in the manner described above. This cell balancing method, in conjunction with the charging scheme, causes the charge current to match the current required by the balancing circuit so that a net current received by the cells having reached the target charging value is substantially zero.

FIGS. 5A and 5B illustrates the affect of the cell balancing method described above. In FIG. 5A, the charge current being delivered by the charger to the battery pack has been reduced to the minimum charge current (e.g., 200 mA) that can be output by the charger. When a given cell exceeds the target charge value, current is diverted around the given cell during the next charging cycle. During this next charging cycle, a balance current begins to develop, where the balance current is understood to be the current in the discharge path parallel to the given cell. Once the given cell is fully charged, the balance current will stabilize as indicated at 91. In some instances (not shown), the charge current will equal the balance current so that the net current received by the given cell is zero.

In other instances, the charge current will exceed the balance current as shown in FIG. 5B. In these instances, the average charge current delivered to the battery cells may be lowered further by skipping charge cycles. The average charge current may be lowered until the average charge current over a period of time (e.g., five charge cycles) equals the balance current as indicated at 93 and the net current received by the given cell over the period of time is zero.

Figure 6:
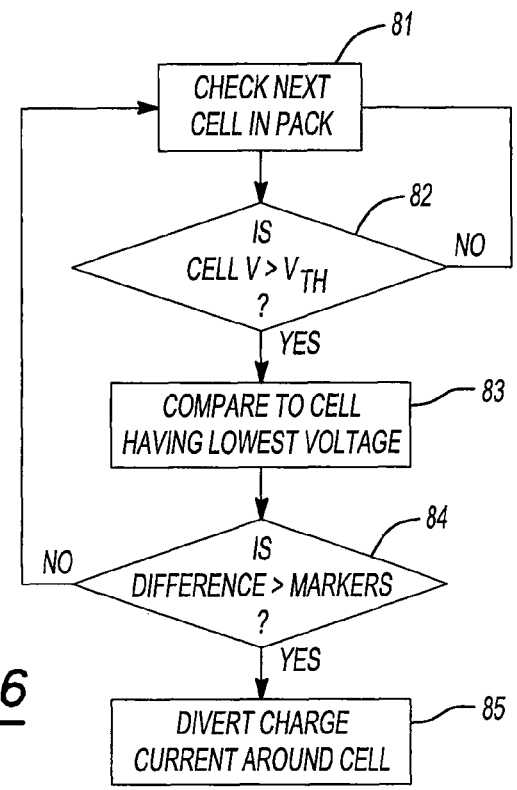
FIG. 6 is a flowchart illustrating an exemplary cell balancing scheme according to the present disclosure The drawings described herein are for illustration purposes only and are not intended to limit the scope of the present disclosure in any way.

In an alternative embodiment, it is feasible to initiate the balancing regime before the cells reach the target charge value. For instance, cell voltages of battery cells having a LiPO4 chemistry typically begin to diverge before reaching the target charge value (e.g., about 400 mV before). In these instances, the balancing method may be enhanced as shown in FIG. 6.

Cell voltages for each cell are compared at 82 to a threshold value. In this instance, the threshold is set to a value less than the target charge value but just below a voltage where divergence is expected to occur. If the cell voltage for a given cell exceeds this threshold, then the cell voltage is compared at 83 to the cell voltage of the cell having the lowest cell voltage; otherwise, process is repeated for the cell in the pack. When the difference between the cell voltages is greater than some predefined margin (e.g., 0.05 v) as determined at 84, then the charge current is diverted at 85 around the given cell. If the difference is less than the margin, no action is taken and the process is repeated for the next cell in the pack. In effect, cell balancing is initiated before any of the cells have reached the target charge value. By continuing to charge some of the cells at a higher charge current, the charging scheme is able to complete charging of all cells sooner.

The charging scheme and the balancing scheme are preferably implemented in the battery control unit. It is also envisioned that required cell voltages and commands may be passed between the battery control unit and the charger control unit such that these schemes are implemented in the charger control unit. In either case, it is to be understood that only the relevant steps of these schemes are discussed in relation to FIGS. 3 and 4, but that other software-implemented instructions may be needed to control and manage the overall operation of the system.

The following description is merely exemplary in nature and is not intended to limit the present disclosure, application, or uses.

What is claimed is:

1. A method for charging a plurality of cells in a battery pack to a target charging value, comprising:
    delivering a charging current having a periodic pulsed waveform from a charger during repeatable charge cycles to the plurality of cells until cell voltage for each of the plurality of cells is within a range of the target charging value;
    monitoring cell voltage of each cell in the plurality of cells to determine when at least one of the cells reaches the target charging value;
    diverting the charging current around the cells having reached the target charging value and cooperatively adjusting the charging current during subsequent charge cycles by lowering the charging current until the charging current reaches a minimum charging current that can be output by the charger and furthering lowering the charging current by skipping pulses after the charging current reaches the minimum charging current that can be output by the charger.

2. The method of claim 1 further comprises detecting a divergence in cell voltage amongst two or more of the plurality of cells, prior to reaching a target charging value; and diverting the charging current from select cells of the plurality of cells when the divergence exceeds a threshold.

3. The method of claim 1 wherein adjusting the charging current further comprises lowering an average charge current delivered to equal a balance current for the cells.

4. The method of claim 1 further comprises diverting charging current from a given cell by routing the charging current along a low resistance circuit path positioned in parallel with the given cell.

5. The method of claim 1 further comprises monitoring cell voltages using a single analog-to-digital converter connected between the plurality of cells and a battery control unit in the battery pack.

6. The method of claim 1 further comprises delivering the charging current until cell voltage for each of the plurality of cells is within a range of the target charging value.

7. A method for charging a plurality of cells in a battery pack to a target charging value, comprising:
    delivering a charging current having a periodic pulsed waveform from a charger during repeatable charge cycles to the plurality of cells until cell voltage for each of the plurality of cells is within a range of the target charging value;
    monitoring cell voltage of each cell in the plurality of cells;
    detecting a divergence in cell voltage amongst two or more of the plurality of cells, prior to reaching a target charging value;
    diverting the charging current from select cells of the plurality of cells when the divergence exceeds a threshold;
    detecting when cell voltage of at least one cell reaches the target charging value; and
    diverting the charging current from the cells having reached the target charging value and cooperatively adjusting the charging current during subsequent charge cycles by lowering the charging current until the charging current reaches a minimum charging current that can be output by the charger and furthering lowering the charging current by skipping pulses after the charging current reaches the minimum charging current that can be output by the charger.

8. The method of claim 7 further comprises delivering the charging current to the plurality of cells during repeatable charge cycles and adjusting the charging current during charge cycles where at least one of the cells is at the target charging value.

9. The method of claim 7 further comprises diverting charging current from a given cell by routing the charging current along a low resistance circuit path positioned in parallel with the given cell.

10. The method of claim 7 further comprises monitoring cell voltages using a single analog-to-digital converter connected between the plurality of cells and a battery control unit in the battery pack.

11. The method of claim 7 further comprises delivering the charging current until cell voltage for each of the plurality of cells is within a range of the target charging value.

12. A system for charging a battery pack operably coupled to a battery charger, the battery pack comprising:
   a plurality of serially-connected battery cells;
   a voltage monitoring circuit configured to measure voltage across each of the cells and to selectively divert a charging current from one or more of the battery cells; and
   a battery control unit configured to receive voltage measurements from the voltage monitoring circuit and interface with the voltage monitoring circuit to divert a charging current from select battery cells whose voltage measures exceed a target threshold, the battery control unit cooperatively functions with the battery charger to adjust a charging current received therefrom so that a net current received by the select battery cells is substantially zero wherein the battery charger delivers a charging current having a periodic pulsed waveform from a charger during repeatable charge cycles to the plurality of cells until cell voltage for each of the plurality of cells is within a range of the target threshold and, when at least one of the cells reaches the target threshold, lowers the charging current until the charging current reaches a minimum charging current that can be output by the charger and further lowers the charging current by skipping pulses after the charging current reaches the minimum charging current that can be output by the charger.

13. The battery pack of claim 12 wherein the battery control unit communicates through a serial data link with a control unit in the battery charger.

14. The battery pack of claim 12 wherein the voltage monitoring circuit further comprises
   a plurality of cell monitoring circuits, each cell monitoring circuit is configured to measure voltage across a different one of the battery cells and output a voltage measure to a measurement node common to the plurality of cell monitoring circuits; and
   a multiplexer controller coupled to each of the cell monitoring circuits and operable to select a voltage measure from at least one of the cell monitoring circuits to present at the measurement node.

15. The battery pack of claim 14 further comprises a single analog-to-digital converter connected between the measurement node and a pin of the battery control unit.

* * * * *